United States Patent [19]

Eade et al.

[11] Patent Number: 6,092,888
[45] Date of Patent: Jul. 25, 2000

[54] METHOD OF TRANSMITTING RASTER INFORMATION FROM A HOST COMPUTER TO AN INK JET PRINTER AND CORRESPONDING METHOD OF PRINTING

[75] Inventors: Thomas Jon Eade; Scott Michael Heydinger, both of Lexington, Ky.

[73] Assignee: Lexmark International, Inc., Lexington, Ky.

[21] Appl. No.: 08/868,694

[22] Filed: Jun. 4, 1997

[51] Int. Cl.[7] ....................................................... B41J 2/21
[52] U.S. Cl. ............................................... 347/43; 347/41
[58] Field of Search ................................. 347/43, 41, 40

[56] References Cited

U.S. PATENT DOCUMENTS

| | | | |
|---|---|---|---|
| 4,059,183 | 11/1977 | Hoskins | 400/124.27 |
| 4,953,104 | 8/1990 | Yeh et al. | 364/519 |
| 4,985,850 | 1/1991 | Okamoto | 364/519 |
| 5,003,494 | 3/1991 | Ng | 364/519 |
| 5,091,734 | 2/1992 | Suzuki et al. | |
| 5,257,098 | 10/1993 | Lee | 358/500 |
| 5,323,488 | 6/1994 | Udagawa | 395/425 |
| 5,351,074 | 9/1994 | Kadowski et al. | 346/157 |
| 5,450,532 | 9/1995 | Bockman et al. | 3965/115 |
| 5,490,237 | 2/1996 | Zimmerman et al. | 395/115 |
| 5,654,744 | 8/1997 | Nicoloff, Jr. et al. | 347/43 |

Primary Examiner—N. Le
Assistant Examiner—Lamson D. Nguyen
Attorney, Agent, or Firm—John J. Mcardle

[57] ABSTRACT

A host computer transmits raster information to a multi-color ink jet printer. The printer includes a printhead connected with an electrical processor. The printhead includes a plurality of arrays of ink jetting heaters. Each array of ink jetting heaters corresponds to a different color ink to be jetted onto the print medium, and is offset relative to an adjacent array of ink jetting heaters in an advance direction of the print medium. First raster information for a first raster is transmitted from the host computer to the electrical processor of the printer. The first raster information is associated with a first array of ink jetting heaters. The print medium is printed on by selectively actuating the ink jetting heaters of the first array of ink jetting heaters, using the first raster information. After the first printing step, second raster information for a second raster is transmitted to the electrical processor. The second raster information is associated with the first array of ink jetting heaters. After the first printing step, third raster information for the first raster is transmitted to the electrical processor. The third raster information is associated with a second array of ink jetting heaters. After the second and third transmitting steps, the print medium is printed on by selectively actuating the ink jetting heaters of the first and second arrays of ink jetting heaters, respectively using the second and third raster information.

17 Claims, 5 Drawing Sheets

METHOD OF TRANSMITTING RASTER INFORMATION FROM A HOST COMPUTER TO AN INK JET PRINTER AND CORRESPONDING METHOD OF PRINTING

BACKGROUND OF THE INVENTION

1. Field of the Invention

The present invention relates to host-based ink jet printers, and, more particularly, to a method of transmitting raster information from the host computer to the ink jet printer and thereafter printing with the printer using the transmitted raster information.

2. Description of the Related Art

Ink jet printers commonly include a printhead which is mounted on a carriage assembly. The carriage assembly is movable in a transverse direction, relative to an advance direction of a print medium such as paper. As the printhead is moved across the print medium during a particular pass of the carriage assembly, ink is selectively jetted from ink jetting orifices formed in the printhead and is deposited on the print medium at corresponding ink dot placement locations. Since the printhead moves in a direction transverse (e.g., perpendicular) to the advance direction of the print medium, each ink emitting orifice passes in a linear manner over the print medium. The line associated with each ink emitting orifice which overlies the print medium is commonly referred to as a raster. A plurality of rasters which extend across the image area of the print medium are disposed vertically adjacent to each other in the advance direction of the print medium.

Multi-color ink jet printers typically include a printhead having a plurality of ink emitting orifices therein. The ink emitting orifices are segregated into different arrays of ink emitting orifices, with each array corresponding to the different color inks which are to be jetted onto the print medium. With a known tri-color printhead, a first array of ink emitting orifices is used for jetting yellow ink onto the print medium, a second array of ink emitting orifices is used for jetting magenta ink onto the print medium, and a third array of ink emitting orifices is used for jetting cyan ink onto the print medium. The first, second and third arrays of ink emitting orifices are sequentially arranged relative to the advance direction of the print medium. Associated with each ink emitting orifice in the three arrays of ink emitting orifices is a corresponding ink jetting heater. Actuation of a particular ink jetting heater causes the formation of a bubble within the ink disposed adjacent thereto and expels the ink from the associated ink emitting orifice. The host computer transmits raster information to the printer for selective actuation of the ink jetting heaters.

With a tri-color printhead as described above, it is known to transmit raster information from the host computer to the printer such that raster information for each array of the printhead is simultaneously received. For example, assuming that each array of ink emitting orifices in the tri-color printhead corresponds to eight rasters on the print medium, it is known to transmit raster information for eight rasters of yellow, eight rasters of magenta and eight rasters of cyan prior to the first pass of the printhead. Since the yellow, magenta and cyan ink is sequentially rather than simultaneously jetted onto the rasters of the print medium, only the raster information corresponding to the yellow array of ink jetting heaters is actually used during the first pass of the printhead. The raster information for the magenta and cyan ink jetting heaters must therefore be stored in memory until used during subsequent passes of the printhead. The printer must thus include a capability of storing, sorting and retrieving the additional raster information as needed.

Although a technique of transmitting raster information from the host computer to the printer as described above typically is adequate, it is not optimum from an efficiency standpoint and results in a printer with an oversized memory capacity. An increase in the memory capacity of the printer in turn may increase the cost and complexity of the printer.

What is needed in the art is a method of more efficiently transmitting raster information from the host computer to the ink jet printer, and thereafter printing on the print medium using the transmitted raster information.

SUMMARY OF THE INVENTION

The present invention provides a method of transmitting raster information to a host-based ink jet printer, wherein only the raster information needed for a particular scan of the printhead is transmitted to the printer. The printer carries out printing without storing a substantial amount of unneeded raster information.

The invention comprises, in one form thereof, a method of transmitting raster information from a host computer to a multi-color ink jet printer. The host computer outputs raster information corresponding to a plurality of rasters of ink dot placement locations on the print medium in a direction transverse to an advance direction of the print medium. The ink jet printer includes an electrical processor having an input which is coupled with and receives the raster information from the host computer output. A printhead is connected to the electrical processor, and includes a plurality of arrays of ink jetting beaters. Each array of ink jetting heaters corresponds to a different color ink to be jetted onto the print medium, and is offset relative to an adjacent array of ink jetting heaters in the advance direction of the print medium. First raster information for a first raster is transmitted to the electrical processor of the printer. The first raster information is associated with a first array of ink jetting heaters. The print medium is printed on by selectively actuating the ink jetting heaters of the first array of ink jetting heaters, using the first raster information. After the first printing step, second raster information for a second raster is transmitted to the electrical processor of the printer. The second raster information is also associated with the first array of ink jetting heaters. After the first printing step, third raster information for the first raster is transmitted to the electrical processor of the printer. The third raster information is associated with a second array of ink jetting heaters. After the second and third transmitting steps, the print medium is printed on by selectively actuating the ink jetting heaters of the first and second arrays of ink jetting heaters, respectively using the second and third raster information.

An advantage of the present invention is that memory requirements in the ink jet printer are reduced by only transmitting raster information from the host computer to the printer which is needed for an associated scan of the printhead across the print medium.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
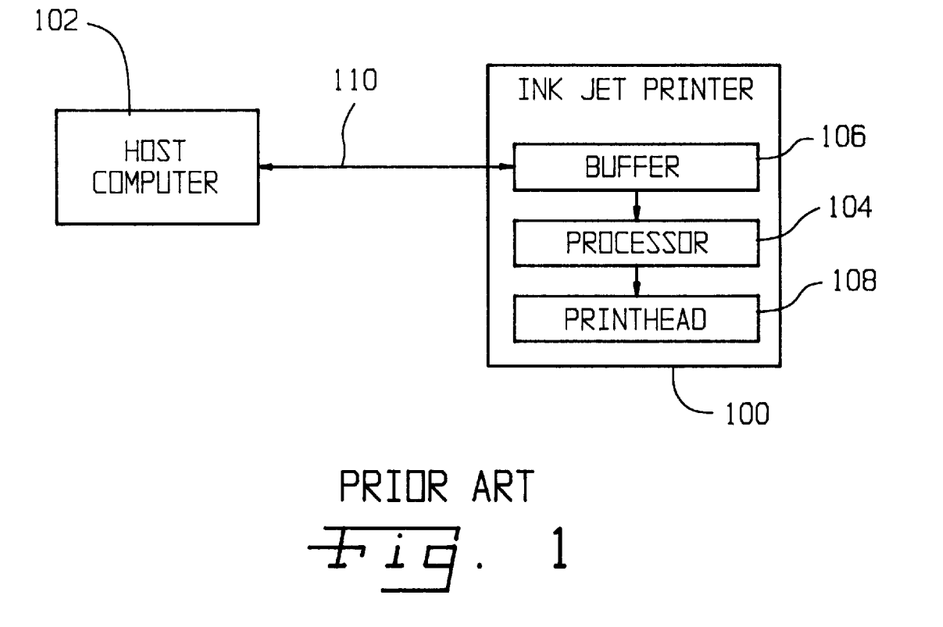
FIG. 1 is a schematic representation of an ink jet printer coupled with a host computer.

Referring now to the drawings, and more particularly to FIG. 1, there is shown a schematic illustration of an ink jet printer 100 coupled with a host computer 102. Ink jet printer 100 includes a processor 104 with an input (not numbered) which is coupled with host computer 102 through buffer 106. Processor 104 outputs information to a printhead 108, which in turn uses the information to print an image on a print medium, such as paper. Printhead 108 is either movable across or extends in a direction corresponding to a transverse direction or width of the print medium, relative to an advance direction of the print medium. That is, printhead 108 is either mounted on a carriage assembly which is scanned across the width of the print medium in the transverse direction, or is a page-width printhead extending across the width of the print medium.

Host computer 102 includes an output (not numbered) which is coupled with buffer 106 and processor 104 via conductor 110. Alternatively, host computer 102 may be coupled with buffer 106 and processor 104 using wireless techniques, such as infrared communication. Host computer 102 outputs raster information to processor 104 which corresponds to a plurality of rasters of ink dot placement locations on the print medium in the transverse direction of the print medium, relative to the advance direction.

Regardless of whether printhead 108 moves across the print medium in the transverse direction or extends across the width of the page in the transverse direction, the ink is jetted onto the print medium in a plurality of rasters or horizontal lines which are vertically adjacent to each other. Each raster includes a plurality of horizontally adjacent ink dot placement locations at which the ink may be jetted from printhead 108 onto the print medium.

Figure 2:
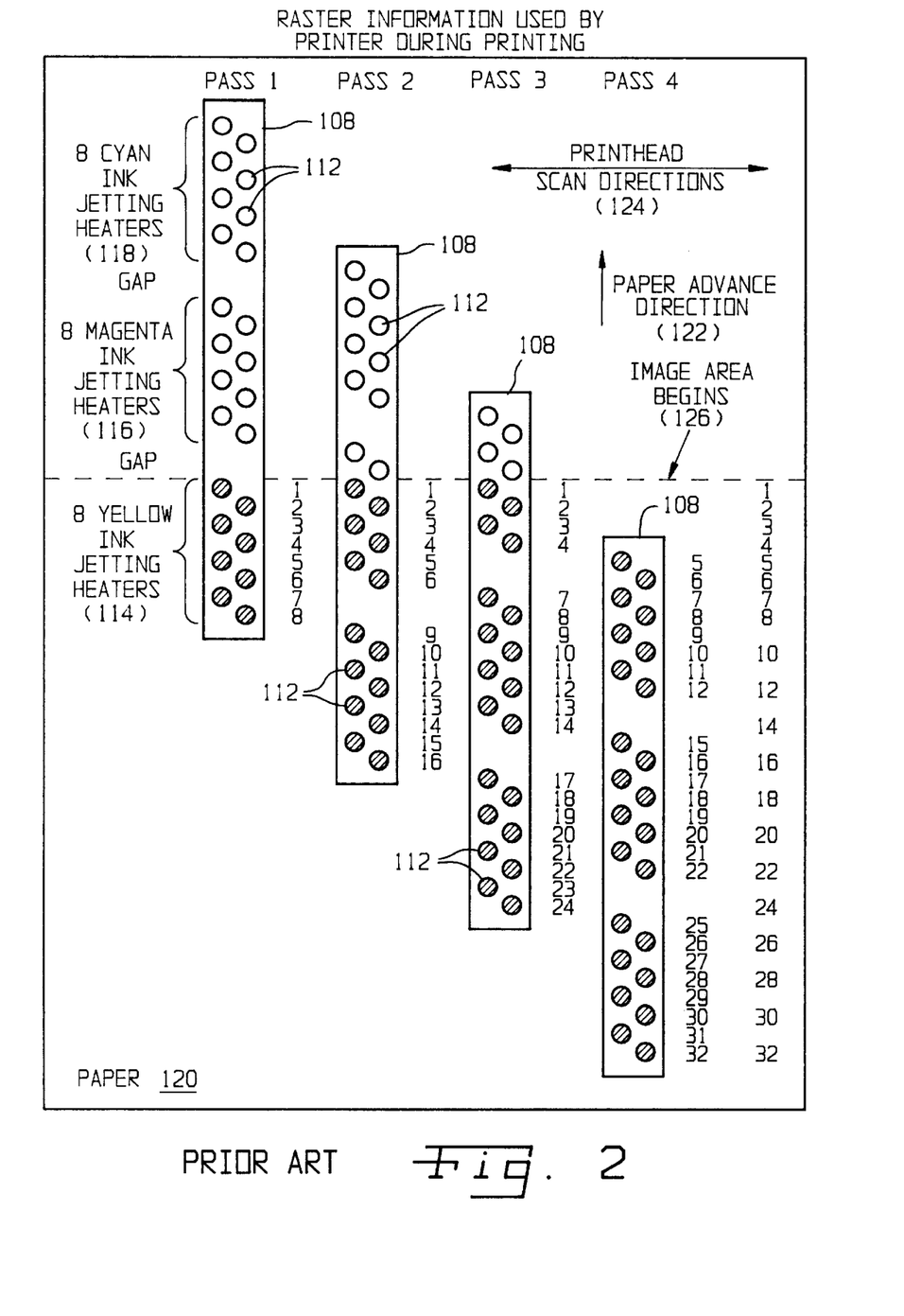
FIG. 2 is a graphical illustration of raster information used by an ink jet printer during successive passes of a printhead across the print medium.

Printhead 108 may be in the form of a multi-color printhead which is used for printing an image on the print medium with a plurality of color inks. Referring to FIG. 2, a multi-color printhead 108 having a plurality of ink jetting heaters 112 is shown. Ink jetting heaters 112 are arranged in a plurality of arrays of ink jetting heaters, with each array of ink jetting heaters corresponding to a different color ink to be jetted onto the print medium. More particularly, printhead 108 includes a first array 114 of yellow ink jetting heaters, a second array 116 of magenta ink jetting heaters, and a third array 118 of cyan ink jetting heaters. Each array of ink jetting heaters 114, 116 and 118 includes eight ink jetting heaters which are disposed in two horizontally adjacent columns which are staggered relative to each other in the advance direction 122 of paper 120. Each ink jetting heater 112 is associated with a corresponding ink jetting orifice (not shown) in printhead 108, through which the different color inks are jetted onto paper 120. In the embodiment shown, each array 114, 116 and 118 of ink jetting heaters includes eight ink jetting heaters; however, it will be appreciated that the number and geometric configuration of each array may vary. For manufacturing purposes, a gap exists between each array 114, 116 and 118 of ink jetting heaters in the paper advance direction 122. In the embodiment shown, the gap corresponds to a distance between two ink jetting heaters 112 within the same column in the advance direction 122. However, it will be appreciated that the actual size of the gap may vary or may be nonexistent.

Each array 114, 116 and 118 of ink jetting heaters is disposed offset relative to an adjacent array of ink jetting heaters in the advance direction 122. For example, the second array 116 of magenta ink jetting heaters is disposed offset relative to the first array 114 of yellow ink jetting heaters. Likewise, the third array 118 of cyan ink jetting heaters is disposed offset relative to the second array 116 of magenta ink jetting heaters. In the embodiment shown, the first array 114, second array 116 and third array 118 of ink jetting heaters 112 are disposed substantially in-line relative to each other in the advance direction 122 (i.e., do not overlap relative to each other in the transverse or printhead scan directions 124). However, it is to be understood that the first array 114, second array 116 and third array 118 of ink jetting heaters 112 may be disposed overlapped relative to each other in other configurations as long as there is an offset between at least two of the arrays of ink jetting heaters in the advance direction 122 of paper 120.

During printing, raster information is transferred from host computer 102 to ink jet printer 100, and thereafter used by ink jet printer 100 for printing during the successive scans of printhead 108. FIG. 2 is a graphical illustration of how the raster information is used by printer 100 during printing of an image in an image area with successive scans of printhead 108. Paper 120 includes an image area 126 in which an image is printed using printhead 108. Image area 126 includes a plurality of rasters or horizontal lines which are indicated with index numbers 1–32 at the right hand side of the image area. When processor 104 receives raster information corresponding to image area 126, paper 120 is advanced in the advance direction 122 until rasters 1–8 of image area 126 substantially align with the eight ink jetting heaters 112 of the first array 114 of ink jetting heaters 112. Printhead 108 is scanned across image area 126 during a first pass by moving the carriage assembly in known manner. Ink jetting heaters 112 of the first array 114 of ink jetting heaters are selectively actuated as printhead 108 scans across image area 126, such that ink is jetted onto paper 120 at selected locations within image area 126. Paper 120 is then moved in the advance direction 122 a distance corresponding to eight rasters such that the first array 114 of yellow ink jetting heaters 112 overlies the next rasters 9–16. Because of the two orifice gap between first array 114 and second array 116, only the first six ink jetting heaters 112 of second array 116 overlie image area 126. Printhead 108 is then scanned across image area 126 during a second pass and magenta ink is selectively jetted onto paper 120 in rasters 1 through 6 while yellow ink is selectively jetted onto paper 120 in rasters 9–16 (with the used ink jetting heaters 112 being shown as cross-hatched in pass 2). Upon completion of pass 2, paper 120 is again moved in advance direction 122 a distance corresponding to eight ink jetting heaters 112. Because of the two orifice gap between the second array 116 and third array 118, only the first four cyan ink jetting heaters 112 are used during a third pass of printhead 108 (the used ink jetting heaters 112 being again shown as cross-hatched during pass 3). After the third pass of printhead 108, paper 120 is again moved in the advance direction a distance corresponding to eight ink jetting heaters. As is apparent from FIG. 2, all of the ink jetting heaters 112 in each of the first array 114, second array 116, and third array 118 are used during the fourth scan of printhead 108. A steady state condition thereafter occurs in which all of ink jetting heaters 112 are used within image area 126. This steady state condition exists until the first array 114 of ink jetting heaters 112 begins to move out of the bottom of image area 126, at which point the first array 114, second array 116 and third array 118 sequentially advance out of image area 126 and are no longer used.

Figure 3:
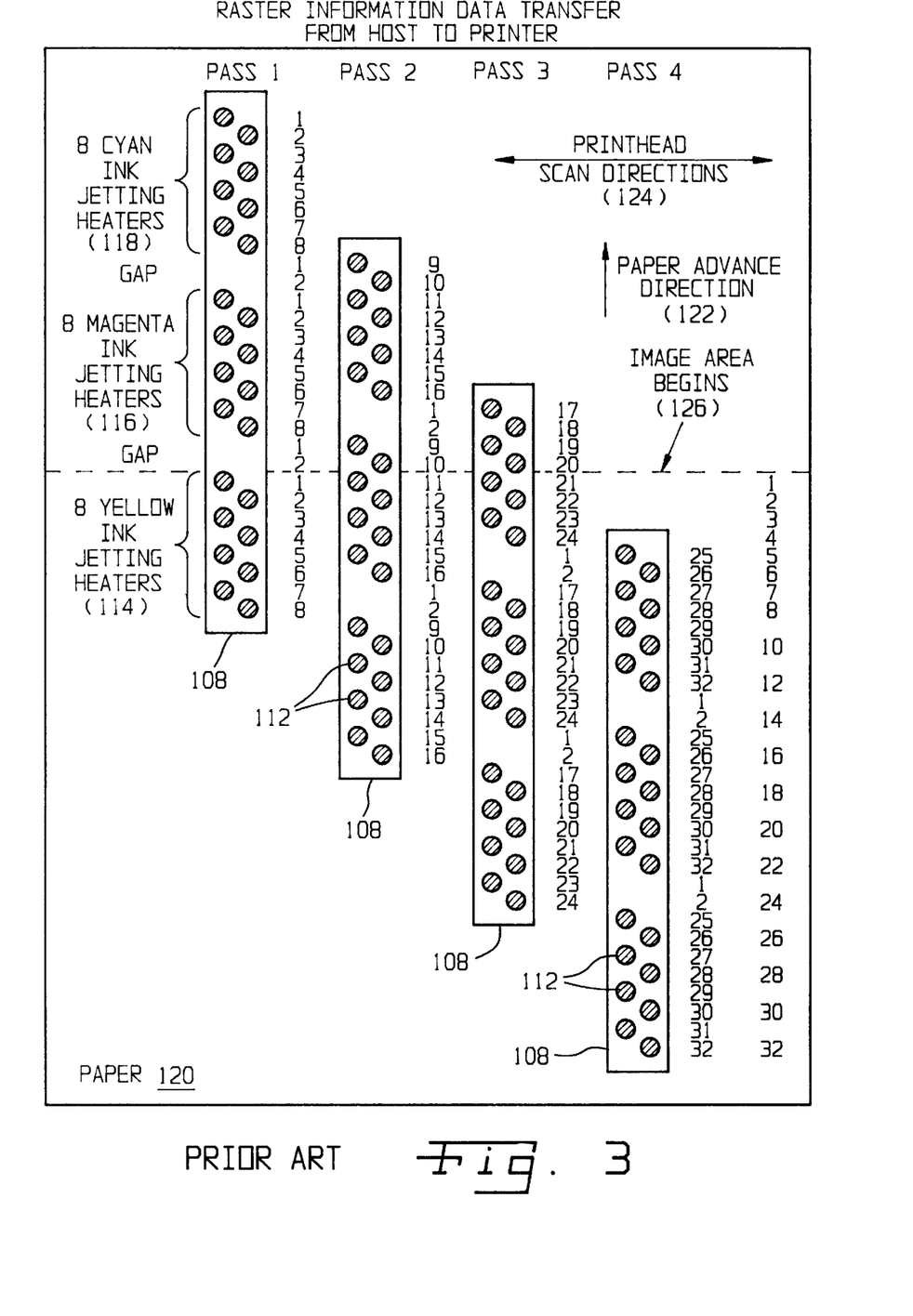
FIG. 3 is a graphical illustration of a known method of transmitting raster information to an ink jet printer for use during successive passes of the printhead, and printing on the print medium using the transmitted raster information.

FIG. 3 is a graphical illustration of a known method of transmitting raster information from a host computer to an ink jet printer for use during successive passes of the printhead 108 across paper 120. Prior to a first scan of printhead 108 during a first pass across paper 120, raster information is transferred from the host computer 102 to printer 100 for the first eight rasters of each color to be printed on paper 120. More particularly, raster information for the first eight rasters to be printed by each of the first array 114, second array 116 and third array 118 of ink jetting heaters 112 is transmitted to processor 104 of printer 100. Since only the first eight rasters using first array 114 are printed during the first pass of printhead 108, the data for the first eight rasters to be printed using the second array 116 and third array 118 must be stored in memory (such as buffer 106 or a separate memory connected with processor 104) for subsequent passes of printhead 108 across paper 120.

After the first pass of printhead 108, paper 120 is moved in the advance direction 122 a distance corresponding to eight rasters. Prior to beginning the next scan of printhead 108 during the second pass, the raster information for the next eight rasters to be printed by each of the first array 114, second array 116 and third array 118 is transmitted from the host computer to the ink jet printer. The data for the next eight rasters which is transmitted prior to the second pass of printhead 108 is labeled 9–16 for each of the first array 114, second array 116 and third array 118 in FIG. 2. It is apparent that the raster information which is transmitted to printer 100 for the first array 114 corresponds to the actual raster information which is used during the second pass of the printhead (note that the raster information actually used during the second pass for actuating first array 114 of the ink jetting heaters 112 is the same in FIGS. 2 and 3). However, it is also apparent that the raster information which is transmitted to printer 100 prior to the second pass of the printhead for the second array 116 of magenta ink jetting heaters 112 (see FIG. 3) does not correspond to the raster information which is actually used during the second pass of the printhead 108 (see FIG. 2). Rather, the raster information for second array 116 associated with rasters 9–16 is stored in memory and the raster information for rasters 1–6 is retrieved from memory and used during the second pass of printhead 108. Likewise, the raster information for the third array 118 of cyan ink jetting heaters 112 is not used during the second pass of the printhead and must also be stored in memory for later use.

For each subsequent pass of printhead 108, raster information for the next eight rasters is transmitted to processor 104 of printer 100 for each of the first array 114, second array 116 and third array 118, even though some of the raster information is not used during the next pass of the printhead. Accordingly, with known methods, ink jet printer 100 must have enough memory to store 8+2+8+2+8 cyan rasters, 8+2+8 magenta rasters and 8 yellow rasters, for a total of 54 rasters (where the integer 8 represents raster information to be used during a subsequent pass and the integer 2 represents raster information associated with an adjacent two orifice gap). For a printer having a resolution of 300 dots per inch (dpi) and a width of approximately eight inches, a total of 54 rasters×300 dpi×8 inches×1 byte/8 bits=16,200 bytes of required memory storage, without compressing the data. The need for such increased memory may be undesirable and increases the cost and complexity of printer 100.

Figure 4:
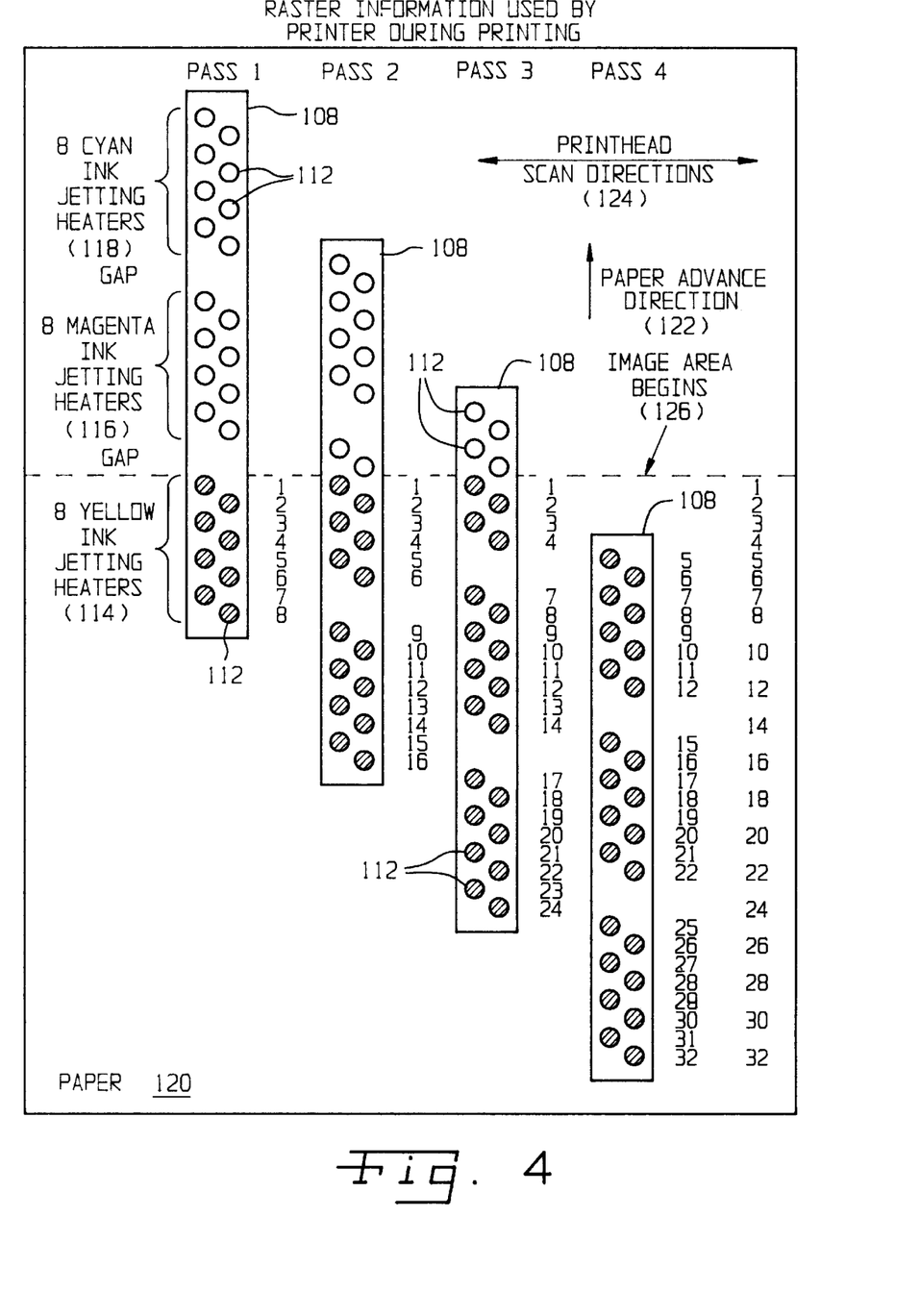
FIG. 4 is a graphical illustration of one embodiment of the method of the present invention for transmitting raster information to an ink jet printer for use during successive passes of the printhead, and printing on the print medium using the transmitted raster information.

FIG. 4 illustrates one embodiment of the present invention for reducing memory requirements in printer 100 by transmitting raster information to processor 104 which is used during a next pass of printhead 108. Prior to a first pass of printhead 108, only raster information for the first eight rasters to be printed by the first array 114 are transmitted from host computer 102 to processor 104. Raster information to be used for actuating the second array 116 and third array 118 during subsequent passes of printhead 108 is not transmitted to processor 104 prior to pass 1. Rather, only the raster information which is to be used during the first pass of printhead 108 is transmitted to electrical processor 104. It is therefore unnecessary to store the raster information for the first eight rasters to be printed with the second array 116 and third array 118, as is the case with the known method of transmitting raster information shown in FIG. 3. During the first pass of printhead 108 across paper 120, the first array 114 of yellow ink jetting heaters 112 are selectively actuated to jet ink onto paper 120 in the first eight rasters on paper 120. After the first pass of printhead 108, paper 120 is moved in the advance direction 122 a distance corresponding to eight rasters. Thus, only the first six rasters are actually printed with the second array 116 of magenta ink jetting heaters 112. Prior to the second pass of printhead 108, the next eight rasters to be printed with the first array 114 (i.e., rasters 9–16) and the first six rasters to be printed with the second array 116 (i.e., rasters 1–6) are transmitted from host computer 102 to processor 104. Thus, as with the first pass of printhead 108, only raster information which is used during the second pass of printhead 108 is transmitted from host computer 102 to printer 100. It is therefore unnecessary to store raster information transmitted immediately prior to the second pass of printhead 108 for use during subsequent passes of printhead 108 across paper 120.

It will be appreciated that upon comparison of FIG. 4 with FIG. 2, the raster information which is actually transmitted from host computer 102 to printer 100 (see FIG. 4) directly corresponds to the raster information which is used during the next pass of printhead 108 across paper 120 (see FIG. 2). It is therefore unnecessary to store raster information in memory to be used during subsequent passes of printhead 108 across paper 120. Accordingly, with the present invention, it is only necessary to store a maximum of eight yellow rasters, eight magenta rasters and eight cyan rasters for use by printer 100 during a steady state condition as shown in pass 4 and a number of subsequent passes when each of the first array 114, second array 116 and third array 118 overlie image area 126. Accordingly, a memory within printer 100 (such as buffer 106) must have a memory of 8+8+8=24 rasters×300 dpi×8 inches×1 byte/8 bits=7200 bytes of required memory storage, without compressing the data and disregarding the 2 orifice gaps. This results in a substantial memory savings for printer 100.

Figure 5:
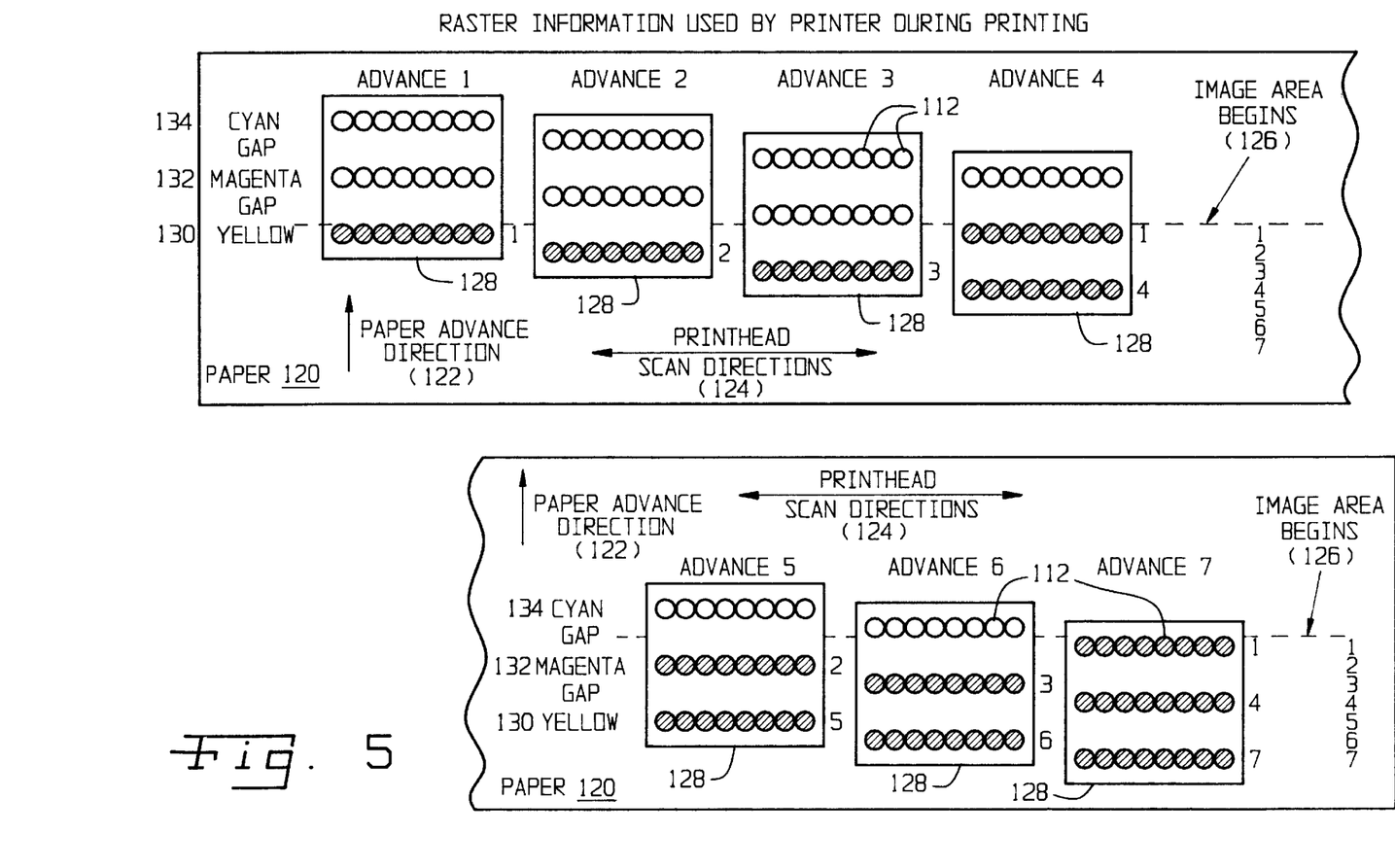
FIG. 5 is a graphical illustration of raster information used by an ink jet printer having a page-width printhead during consecutive advances of the print medium in an advance direction.

Referring now to FIG. 5, there is shown a graphical illustration of raster information used by an ink jet printer having a page-width printhead 128 during consecutive advances of paper 120 in the advance direction 122. For purposes of illustration, printhead 128 is shown with only eight ink jetting heaters 112 corresponding to eight ink dot placement locations on paper 120. However, it is to be understood that printhead 128 actually includes a number of ink jetting heaters 112 which is dependent upon the resolution of the printer and the width of the image area 126 on paper 120. For example, with a printer 100 having a resolution of 300 dpi and an eight inch wide image area 126, each of a first array 130, second array 132 and third array 134 would include approximately 2400 ink jetting heaters 112. With respect to the pagewide printhead 128 of FIG. 5, scan directions 124 correspond to an effective scanning when the ink jetting heaters 112 in each of the rows 130, 132, and 134 are sequentially actuated. It is to be understood, however, that such effective scanning may be eliminated, if desired, by the simultaneous actuation of the ink jetting heaters 112.

Using the present invention in conjunction with the page-width printhead shown in FIG. 5, raster information for a first array 130 of yellow ink jetting heaters 112 is transmitted from host computer 102 to the printer. Paper 120 is moved in the advance direction 122 until the first array 130 overlies raster 1 of image area 126. The yellow ink jetting heaters 112 in the first array 130 are then selectively energized to jet yellow ink onto the first raster at selected locations. The paper is then moved in the advance direction 122 a distance corresponding to one raster. Yellow ink is then selectively placed on raster 2 using the first array 130 of ink jetting heaters. Paper 120 is again moved in the advance direction 122 a distance corresponding to one raster and yellow ink is jetted onto raster 3. Paper 120 is then again moved in the advance direction 122 a distance corresponding to one raster. After the fourth advance of paper 120, first array 130 of yellow ink jetting heaters 112 overlies raster 4, and second array 132 of magenta ink jetting heaters 112 overlies raster 1. Yellow ink is then placed at selected ink dot locations in raster 4, and magenta ink is placed at selected ink dot placement locations in raster 1. With the fifth advance of paper 120, first array 130 overlies raster 5 and second array 132 overlies raster 2; and with the sixth advance of paper 120, the first array 130 overlies raster 6 and the second array 132 overlies raster 3. After the seventh advance of paper 120, a steady state condition occurs in which all three of the first array 130, second array 132 and third array 134 overlie corresponding rasters within image area 126. This steady state condition exists until the ink jetting heaters 112 begin to move out of the bottom of image area 126 on paper 120.

Using the known method of transmitting raster information from host computer 102 to a page-width printhead 128, raster information for raster 1 to be printed by each of the first array 130, second array 132 and third array 134 is transmitted from host computer 102 to the printer prior to jetting the yellow ink onto raster 1 associated with advance 1 of paper 120. The first raster to be printed by the second array 132 and third array 134 must therefore be stored in memory for use during a subsequent jetting of ink jetting heaters 112 associated with a particular advance of paper 120. Again assuming a two orifice gap between each array of ink jetting heaters 112 for manufacturing purposes, the raster information associated with all of the ink jetting heaters which are not shown as cross-hatched in FIG. 5 for a particular advance of paper 120 must be stored in a memory (such as buffer 106) of printer 100. The printer must therefore have enough memory capacity to store 1+2+1+2+1 cyan rasters, and 1+2+1 magenta rasters, and one yellow raster, for a total of 12 rasters.

On the other hand, with the method of the present invention of transmitting raster information from host computer 102 to a page-width printhead 128, a maximum of only three rasters must be stored by a memory within the printer. That is, during a steady state condition, only three rasters of information are transmitted from host computer 102 to the printer, and only three rasters of information are printed in associated actuation of the ink jetting heaters within the first array 130, second array 132 and third array 134 of printhead 128. The present invention therefore also reduces memory requirements within the printer when used in conjunction with a page-width printhead 128.

Although the present invention has been described with reference to preferred embodiments, those skilled in the art will recognize that changes may be made in form and detail without departing from the spirit and scope of the following claims.

What is claimed is:

1. A method of transmitting data from a host computer to a multi-color ink jet printer, the ink jet printer used for printing an image on a print medium with a plurality of color inks, the print medium being movable in an advance direction, said method comprising the steps of:

providing a host computer having an output, said host computer outputting raster information corresponding to a plurality of rasters of ink dot placement locations on the print medium in a direction transverse to the advance direction of the print medium;

providing the ink jet printer with an electrical processor having an input which is coupled with said host computer output, said electrical processor receiving said raster information;

providing the ink jet printer with a print head connected to said electrical processor, said printhead having a plurality of ink jetting heaters arranged in a plurality of arrays, each said array of ink jetting heaters corresponding to a different one of the plurality of color inks to be jetted onto the print medium, each said array of ink jetting heaters being offset relative to an adjacent said array of ink jetting heaters in the advance direction of the print medium;

transmitting first raster information for a first raster from said host computer to said electrical processor of said printer, said first raster information for said first raster being associated with a first array of said plurality of arrays of ink jetting heaters;

after said first transmitting step, transmitting second raster information for a second raster from said host computer to said electrical processor of said printer, said second raster information for said second raster being associated with said first array of ink jetting heaters; and after said second transmitting step, transmitting third raster information for said first raster from said host computer to said electrical processor of said printer, said third raster information for said first raster being associated with a second array of said plurality of arrays of ink jetting heaters, said second array of ink jetting heaters being different from said first array of ink jetting heaters.

2. The method of printing of claim 1, wherein said third transmitting step is carried out before said second transmitting step.

3. The method of printing of claim 1, wherein said printhead is movable in said direction transverse to the advance direction of the print medium.

4. The method of printing of claim 1, wherein said printhead comprises a page-wide printhead extending in a direction transverse to the advance direction of the print medium.

5. The method of printing of claim 1, wherein said plurality of arrays of ink jetting heaters include a yellow array of ink jetting heaters, a magenta array of ink jetting heaters and a cyan array of ink jetting heaters.

6. A method of printing an image on a print medium using a multi-color ink jet printer with a plurality of color inks, the print medium being movable in an advance direction, said method comprising the steps of:

providing a host computer having an output, said host computer outputting raster information corresponding to a plurality of rasters of ink dot placement locations on the print medium in a direction transverse to the advance direction of the print medium;

providing the ink jet printer with an electrical processor having an input which is coupled with said host computer output, said electrical processor receiving said raster information;

providing the ink jet printer with a printhead connected to said electrical processor, said printhead having a plurality of ink jetting heaters arranged in a plurality of arrays, each said array of ink jetting heaters corresponding to a different one of the plurality of color inks to be jetted onto the print medium, each said array of ink jetting heaters being offset relative to an adjacent said array of ink jetting heaters in the advance direction of the print medium;

transmitting first raster information for a first raster from said host computer to said electrical processor of said printer, said first raster information associated with a first array of said plurality of arrays of ink jetting heaters;

printing on the print medium by selectively actuating said ink jetting heaters of said first array of ink jetting heaters, using said first raster information;

after said first printing step, transmitting second raster information for a second raster from said host computer to said electrical processor of said printer, said second raster information associated with said first array of ink jetting heaters;

after said first printing step, transmitting third raster information for said first raster from said host computer to said electrical processor of said printer, said third raster information associated with a second array of said plurality of arrays of ink jetting heaters; and after said second and third transmitting steps, printing on the print medium by selectively actuating said ink jetting heaters of said first array of ink jetting heaters and said second array of ink jetting heaters, respectively using said second and third raster information.

7. The method of printing of claim 6, wherein said third transmitting step is carried out before said second transmitting step.

8. The method of printing of claim 6, wherein said printhead is movable in said direction transverse to the advance direction of the print medium.

9. The method of printing of claim 8, wherein said plurality of arrays of ink jetting heaters include a yellow array of ink jetting heaters, a magenta array of ink jetting heaters and a cyan array of ink jetting heaters.

10. The method of printing of claim 9, wherein said first array of ink jetting heaters corresponds to said yellow array of ink jetting heaters, and said second array of ink jetting heaters corresponds to said magenta array of ink jetting heaters.

11. The method of printing of claim 9, wherein each of said yellow array of ink jetting heaters, said magenta array of ink jetting heaters and said cyan array of ink jetting heaters are disposed in an array of at least two columns of ink jetting heaters extending in the advance direction of the print medium and disposed adjacent to each other in the transverse direction.

12. The method of printing of claim 11, wherein said yellow array of ink jetting heaters, said magenta array of ink jetting heaters and said cyan array of ink jetting heaters are disposed sequentially adjacent to each other in the advance direction of the print medium.

13. The method of printing of claim 6, wherein said printhead comprises a page-wide printhead extending in a direction transverse to the advance direction of the print medium.

14. The method of printing of claim 13, wherein said plurality of arrays of ink jetting heaters include a yellow array of ink jetting heaters, a magenta array of ink jetting heaters and a cyan array of ink jetting heaters.

15. The method of printing of claim 14, wherein said first array of ink jetting heaters corresponds to said yellow array of ink jetting heaters, and said second array of ink jetting heaters corresponds to said magenta array of ink jetting heaters.

16. The method of printing of claim 14, wherein each of said yellow array of ink jetting heaters, said magenta array of ink jetting heaters and said cyan array of ink jetting heaters are disposed in an array of ink jetting heaters extending substantially the width of said printhead in the transverse direction.

17. The method of printing of claim 16, wherein said yellow array of ink jetting heaters, said magenta array of ink jetting heaters and said cyan array of ink jetting heaters are disposed sequentially adjacent to each other in the advance direction of the print medium.

* * * * *